March 3, 1964 H. R. BOYLE 3,123,154
TOOL BAR AND CLAMP UNIT FOR SPRING-TOOTH HARROW SHANKS
Filed Jan. 3, 1963
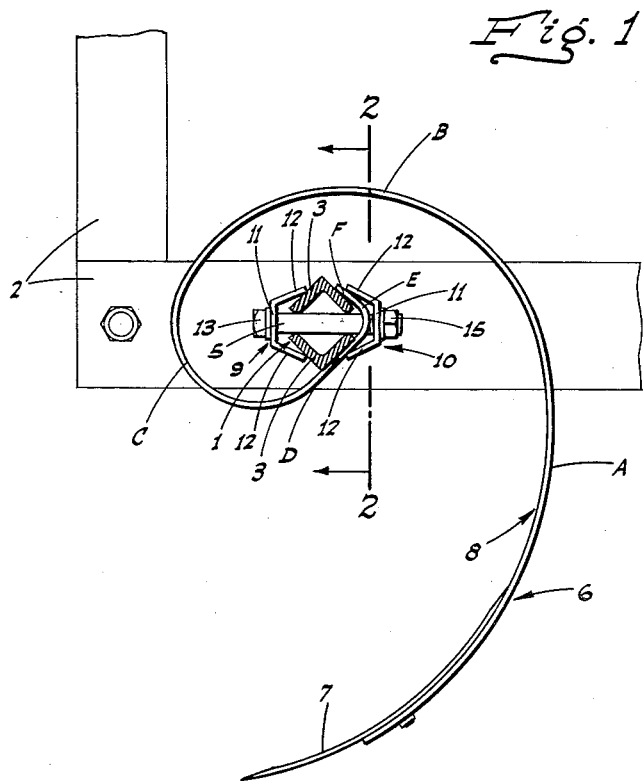
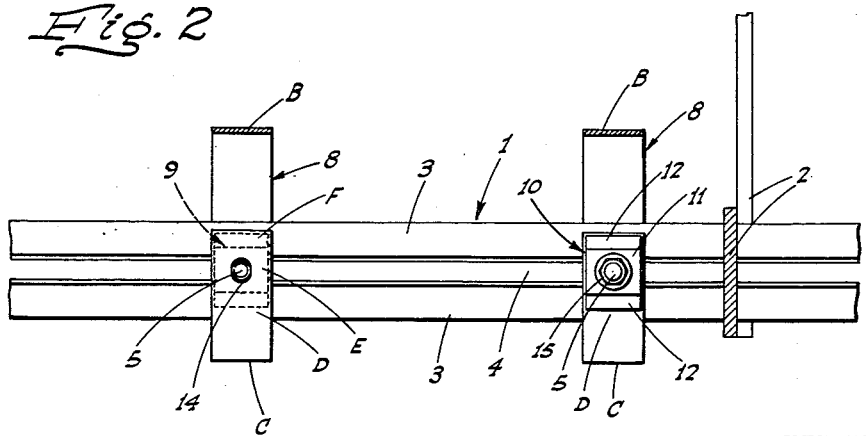
INVENTOR.
Howard R. Boyle
BY
Webster & Webster
ATTYS.

United States Patent Office 3,123,154
Patented Mar. 3, 1964

3,123,154
TOOL BAR AND CLAMP UNIT FOR SPRING-TOOTH HARROW SHANKS
Howard R. Boyle, Mariposa, Calif., assignor, by mesne assignments, to The H. C. Shaw Company, Stockton, Calif., a corporation of California
Filed Jan. 3, 1963, Ser. No. 249,243
2 Claims. (Cl. 172—691)

This invention relates to spring tooth harrows, and particularly to the mounting of the tooth shanks on the tool bar of the implement.

The principal object of my invention is to provide a tool bar of special form, tooth shank-ends formed to cooperate with the tool bar in non-turning relationship, and means to clamp such shank-ends against the tool bar against movement relative thereto in such a manner that bending strains on the shank-ends are so reduced as to greatly increase the fatigue life of the shanks over what is ordinarily the case; a wide range of adjustment and spacing of the various shanks along the tool bar is possible without any bar drilling or other operations being necessary; and the tool bar, which for the purposes of the invention is made of two spaced parts, is stiffened and rigidified upon the shank-end clamps being applied thereto and to the tool bar.

The clamping means for each shank-end includes a bolt which is supported by and projects across the tool bar, and a further object of the invention is to arrange the shank-end clamps in connection with the tool bar and said bolt so that the latter aids in the stiffening of the tool bar and is positively prevented from rotation or axial movement when the clamps are tightened down against the tool bar and shank-end.

It is also an object of the invention to provide a tool bar and clamp unit for spring-tooth harrow shanks which is designed for ease and economy of manufacture.

Another object of the invention is to provide a practical, reliable, and durable tool bar and clamp unit for spring-tooth harrow shanks, and one which will be exceedingly effective for the purpose for which it is designed.

These objects are accomplished by means of such structure and relative arrangement of parts as will fully appear by a perusal of the following specification and claims.

In the drawings:

FIG. 1 is a side elevation of a harrow tooth as clamped on the tool bar; the latter being shown in section.

FIG. 2 is a fragmentary rear end view of the tool bar with a pair of harrow-tooth shanks mounted thereon in spaced relation and taken substantially on line 2—2 of FIG. 1; one shank being shown before the rear clamping member is applied thereto.

Referring now more particularly to the drawings, and to the characters of reference marked thereon, the tool bar from which the harrow teeth depend, and indicated generally at 1, is supported from and rigidly secured, as by welding, to arm units, one of which is shown at 2, and which are disposed in spaced relation at and intermediate the ends of the tool bar, as is conventional procedure.

The tool bar 1 is made up of a pair of 90 degree angle members 3, disposed in opposed and spaced-apart facing relation to each other, with their apices in a common vertical plane, as shown. This arrangement of the angle members leaves longitudinal, horizontally alined slots 4 therebetween, which are open to the front and back of the tool bar 1, and of sufficient width to receive bolts 5 of a certain diameter therethrough in close slidable relation.

Each harrow tooth, indicated generally at 6, comprises—with the ground engaging tooth 7 proper—an upwardly projecting shank 8, which as usual is formed of spring-steel band stock. The shank is formed with an initial large-radius curved portion A, which at its upper end merges into a top portion B of smaller radius which extends over the tool bar 1 from the rear in spaced and concave relation thereto. Portion B, at its forward end, merges into a similarly curved but smaller radius portion C which extends about the front of the tool bar 1 in spaced relation thereto.

At its lower and rearwardly facing end, curved portion C merges in tangential relation with a straight portion D of sufficient length to flatly abut against the rear upwardly sloping side of the lower bar member 3. Portion D at its upper end merges into a short curved portion E of small radius, in concave relation to the tool bar 1, and extending across the adjacent slot 4 of said tool bar. At its upper end, portion E merges in tangential relation into a short lip F which bears against the rear forwardly sloping side of the upper tool bar member 3.

The shank portion D and short lip F of the shank 8 are detachably but firmly clamped against the corresponding sides of the tool bar 1 in the following manner:

Two identical clamps, indicated generally at 9 and 10, are used in connection with a single one of the bolts 5 for each one of the spring teeth 6. Each clamp is of channel form and comprises a back plate 11 having a central hole therethrough for the reception of the bolt 5, and legs 12 of even length. These legs are disposed at an angle to the back plate 11 greater than 90 degrees, but less than that which would place them parallel to the sides of the tool bar members 3. The head 13 of the bolt 5 engages the back plate 11 of the front clamp 9, which is disposed with the ends of its legs 12 bearing against the forward sides of the bar members 3 intermediate the top and bottom thereof, as shown.

The bolt 5 projects through a hole 14 in the curved portion E of the shank 8, and through the hole in the back plate 11 of the rear clamp 10, and which plate is engaged by a nut 15 threaded on the projecting end of said bolt. Said clamp 10 is of course disposed in facing relation to the tool bar 1; the ends of the clamp legs 12 pressing against the straight shank portion D and short lip F intermediate the ends thereof, as clearly shown in FIG. 1.

With the particular tool bar construction, in connection with the specific cooperating shank-end form and clamping means, as described, certain advantages are obtained which it is felt are lacking in the construction and mounting of the corresponding features of conventional spring-tooth harrows. For one thing, a wide range of shank spacing along the tool bar may be had without the drilling of the tool bar being necessary. For another thing, the particular shape and cooperation of the upper end of the shank with the tool bar greatly reduces the bending stresses at the contact point of the shank end with the tool bar members, and the fatigue life of the shank will be greatly increased. Also, the specific form of the clamps and their relationship to the tool bar members causes the clamps to grip and tend to deform or press the sides of said members toward each other and against the various tie bolts; thus forming a more rigid box-section of the separated members of the tool bar than would otherwise be the case. Further, the bolts themselves become clamped and prevented from possible turning and loosening when once the bolt nuts are tightened up and the clamps are drawn into a clamping position.

From the foregoing description it will be readily seen that there has been produced such a device as will substantially fulfill the objects of the invention, as set forth herein.

While this specification sets forth in detail the present and preferred construction of the device, still in practice such deviations from such detail may be resorted to as do not form a departure from the spirit of the invention, as defined by the appended claims.

Having thus described the invention, the following is claimed as new and useful, and upon which Letters Patent are desired:

1. In a spring-tooth harrow, a transversely extending tool bar comprising a pair of 90 degree angle members disposed in spaced relation and with their apices facing away from each other so as to leave relatively widely spaced longitudinally extending slots therebetween, means connecting the members together at spaced points in their length to provide a unitary tool bar, a spring tooth having a shank formed at its upper end with portions to engage the rear sides of the angle members in located relation, and means to clamp said shank portions to the tool bar and including a bolt projecting through and initially slidable along the slots and also projecting through the shank between said portions; said clamping means additionally including clamping members through which the bolt projects, said clamping members being of channel shaped form disposed on opposite sides of the tool bar and including legs projecting toward said tool bar; the legs of the front channel shaped clamping member engaging the front faces of the tool bar members at an angle thereto, and the legs of the rear channel shaped clamping member engaging said shank portions at an angle thereto.

2. In a spring-tooth harrow, a transversely extending tool bar comprising a pair of 90 degree angle members disposed in spaced relation and with their apices facing away from each other so as to leave relatively widely spaced longitudinally extending slots therebetween, means connecting the members together at spaced points in their length to provide a unitary tool bar, and so that the slots lie in a common horizontal plane, a spring tooth having a shank which at the top extends over and above the tool bar from the rear and terminates at the rear of said tool bar in spaced portions flatly engaging the rear angled faces of such tool bar from below, a bolt projecting through the slots and through the shank between said spaced portions thereof, and clamping members disposed on opposite sides of the tool bar, each clamping member having a back plate through which the bolt projects, and legs projecting from the back plate toward the tool bar at an angle of less than 45 degrees to a horizontal plane; the length of the legs being such that the ends of the legs of one clamping member will engage the forward angled sides of the tool bar while the ends of the legs of the other clamping member will engage said flat shank portions intermediate the ends thereof when said clamping members are pulled toward each other by the bolt.

References Cited in the file of this patent

UNITED STATES PATENTS

| | | |
|---|---|---|
| 201,946 | Reed | Apr. 2, 1878 |
| 644,046 | Albright et al. | Feb. 27, 1900 |
| 981,600 | Abercrombie | Jan. 17, 1911 |
| 1,266,489 | Kovar | May 14, 1918 |
| 2,257,650 | Pfeifer et al. | Sept. 30, 1941 |
| 2,760,423 | Lindeman | Aug. 28, 1956 |

FOREIGN PATENTS

| | | |
|---|---|---|
| 657,738 | France | Jan. 16, 1929 |